(12) United States Patent
Burkardt et al.

(10) Patent No.: US 9,873,546 B2
(45) Date of Patent: Jan. 23, 2018

(54) EXTERNAL PACKAGING FOR SAFEGUARDING AT LEAST ONE PACKAGE DURING TRANSPORTATION

(71) Applicants: Holger Burkardt, Waldsee (DE); Norbert Frisch, Mannheim (DE)

(72) Inventors: Holger Burkardt, Waldsee (DE); Norbert Frisch, Mannheim (DE)

( * ) Notice: Subject to any disclaimer, the term of this patent is extended or adjusted under 35 U.S.C. 154(b) by 785 days.

(21) Appl. No.: 13/827,449

(22) Filed: Mar. 14, 2013

(65) Prior Publication Data
US 2013/0205722 A1 Aug. 15, 2013

Related U.S. Application Data

(63) Continuation of application No. PCT/EP2011/067853, filed on Oct. 13, 2011.

(30) Foreign Application Priority Data

Oct. 19, 2010 (EP) .................................. 10187996

(51) Int. Cl.
*B65D 19/38* (2006.01)
*B65D 5/46* (2006.01)
(Continued)

(52) U.S. Cl.
CPC ............ *B65D 19/38* (2013.01); *B65D 5/4612* (2013.01); *B65D 5/603* (2013.01); *B65D 5/62* (2013.01);
(Continued)

(58) Field of Classification Search
CPC .. B65D 75/002; B65D 71/0088; B65D 19/38; B65D 19/44; B65D 5/4612; B65D 5/603;
(Continued)

(56) References Cited

U.S. PATENT DOCUMENTS 3,202,313 A * 8/1965 Wainberg ........... B65D 71/0022
206/176
3,403,840 A * 10/1968 Mathes .............. B65D 75/5844
206/497
(Continued)

FOREIGN PATENT DOCUMENTS

DE 1151215 B1 7/1963
DE 7602244 U1 8/1976
(Continued)

OTHER PUBLICATIONS

English translation of International Preliminary Report on Patentability dated Oct. 16, 2012 in Application No. PCT/EP2011/067853, 7 pages.

(Continued)

*Primary Examiner* — Steven A. Reynolds
(74) *Attorney, Agent, or Firm* — Thomas E. Lees, LLC

(57) ABSTRACT

An external packaging for safeguarding at least one package during transportation is provided. The external packaging includes at least one carrier element with an upper side and a lower side, wherein the carrier element includes at least one base part directed toward the lower side and at least one border directed toward the upper side, and wherein the carrier element is at least partially open toward the upper side and is configured to carry the package. The external packaging furthermore has at least one bag element which is configured to surround the package carried by the carrier element. The bag element is arranged relative to the carrier element in such a manner that the bag element, at least in a maximum filling state, extends on the upper side of the carrier element beyond the border of the carrier element.

20 Claims, 10 Drawing Sheets

(51) Int. Cl.
  *B65D 5/60* (2006.01)
  *B65D 5/62* (2006.01)
  *B65D 71/00* (2006.01)
  *B65D 77/00* (2006.01)
  *B65G 65/00* (2006.01)

(52) U.S. Cl.
  CPC ....... *B65D 71/0092* (2013.01); *B65D 77/003* (2013.01); *B65G 65/00* (2013.01)

(58) Field of Classification Search
  CPC .... B65D 5/62; B65D 75/006; B65D 71/0092; B65G 65/00
  USPC .............. 206/598, 497, 597, 386, 600, 595; 383/203
  See application file for complete search history.

(56) References Cited

U.S. PATENT DOCUMENTS

| | | | | |
|---|---|---|---|---|
| 3,425,544 A * | 2/1969 | Ayer | ...................... | B65D 71/10 206/497 |
| 3,442,436 A * | 5/1969 | Kirby, Jr. | .............. | B65D 71/063 206/497 |
| 3,826,357 A * | 7/1974 | Roth | .................. | B65D 5/48026 206/497 |
| 4,365,737 A | 12/1982 | Marvia | | |
| 4,754,879 A * | 7/1988 | Benno | ...................... | B65D 5/28 206/200 |
| 4,811,848 A * | 3/1989 | Jud | .................... | B65D 75/5838 383/205 |
| 5,184,771 A * | 2/1993 | Jud | .................... | B65D 75/5844 206/524.2 |
| 5,201,463 A * | 4/1993 | George | ................. | B65D 5/4204 206/432 |
| 5,813,540 A * | 9/1998 | Vollbrecht | ........... | B65D 5/2019 206/427 |
| 2003/0209453 A1 * | 11/2003 | Herman | .............. | A61M 15/009 206/204 |
| 2008/0190785 A1 * | 8/2008 | Spivey | ................. | B65D 71/066 206/147 |
| 2010/0025275 A1 * | 2/2010 | Cassina | ................ | B65D 77/061 206/386 |

FOREIGN PATENT DOCUMENTS

| | | |
|---|---|---|
| EP | 0542009 A1 | 5/1993 |
| GB | 2340108 A | 2/2000 |
| JP | S4524383 U2 | 9/1970 |
| JP | 04-031257 A | 2/1992 |
| JP | 2004224419 A | 8/2004 |
| WO | 2001/025101 A1 | 4/2001 |
| WO | 2009/039544 A3 | 4/2009 |

OTHER PUBLICATIONS

English translation of JP 2004-224419 (A).
English translation of JP S45-24383.

* cited by examiner

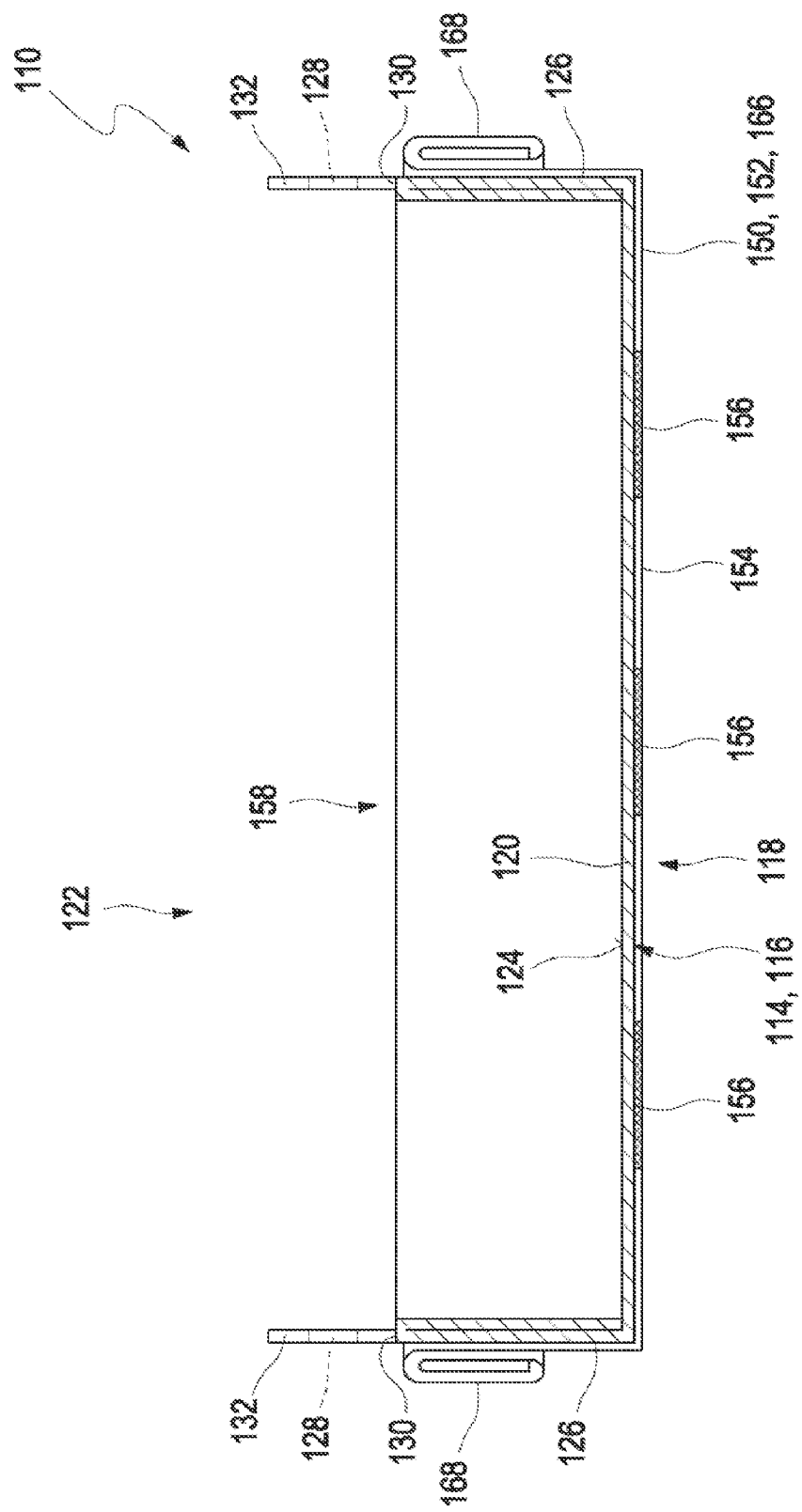

EXTERNAL PACKAGING FOR SAFEGUARDING AT LEAST ONE PACKAGE DURING TRANSPORTATION

CROSS-REFERENCE TO RELATED APPLICATIONS

This application is a continuation of International Application No. PCT/EP2011/067853, filed 13 Oct. 2011, which claims the benefit of European Patent Application No. 10187996.3, filed 19 Oct. 2010, the disclosures of which are hereby incorporated by reference in their entirety.

TECHNICAL FIELD

The present disclosure relates to an external packaging for safeguarding at least one package during transportation. Furthermore, the disclosure relates to a method for safeguarding a product during transportation.

BACKGROUND

External packaging and methods for safeguarding items during transportation are used in particular in the sphere of dispatching dangerous goods, for example dangerous goods from the chemical industry, the pharmaceutical or diagnostic industry, medical technology or other branches of industry. However, other fields of use are also possible.

In the daily routine of dispatching products, a multiplicity of products of identical or different type customarily have to be combined in order to dispatch the products by rail, road, sea or by air freight. This is typically undertaken using transport pallets, i.e., flat structures, on which the products are stacked. Transport pallets are customarily loaded onto transport using a lifting truck or forklift truck. In general, it is important in the case of such freight items that, when the transport pallets are being loaded onto the transport, the goods being transported are adequately protected against falling down, against damage or against the products escaping packaging. In the case of hazardous products, in particular what are referred to as dangerous goods, particularly exacting requirements have to be imposed in this case on the transportation safeguard.

In the case of previous transportation safeguarding techniques, the product is therefore first of all surrounded by one or more packaging materials, for example a carton, thus producing a "package". Such packages are generally placed according to a predefined stacking plan onto a pallet as a carrier, for example a "Euro-pallet" or a "World-pallet" made of wood or plastic. Package layers which are not full are typically filled with empty packing material such as loading aids. The stack is subsequently wrapped with a film in order to form what is referred to as an overpack. In addition, a transportation safeguard, in particular against the packages falling down, generally has to be produced by strapping and/or bands. Furthermore, one or more edge protectors may be applied.

For external packagings which themselves comprise one or more packages with dangerous goods, special requirements are applicable in particular in the sphere of air freight. In particular, IATA (International Air Transport Association) specifications, section 5—"Packaging", 5.0.1.5 are of relevance for overpacks, in which one or more packages with dangerous goods are combined to form a dispatch unit with appropriate identification. According to these specifications, the dispatcher when using an external packaging for surrounding a plurality of packages of dangerous goods has to ensure that various requirements are met. Neither packages that contain different substances, which may react in a hazardous manner with one another, nor packages with dangerous goods which must be separated may be contained within one external packaging. Furthermore, each package within an external packaging has to be correctly packed, labeled, identified and be without signs of damage or leakage. Certain requirements regarding the identification of the packages also have to be met, and the designated function of each package must not be impaired by the external packaging.

Current overpacks, in which one or more packages are combined as a transport unit and are secured for transportation, have a number of disadvantages. Current overpacks for safeguarding items during transportation generally require a fixed connection of the packages to a pallet as load carrier, for example in the form of strapping. Furthermore, the manual production of overpacks is labor-intensive and extremely costly with regard to the transportation expense, in particular in air freight. Irrespective of the weight of the packages, the weight resulting from the transport pallet as carrier, typically about 25 kg, also always has to be taken into consideration in the costs of the customary overpacks, which, per overpack unit, typically can cause increased costs of currently typically almost 70 Euros per dispatch unit. Furthermore, customary transport pallets are not only associated with a considerable weight but also with considerable material costs since, typically, transport circuits are not closed circuits and the transport pallets are generally not transported back to the freight starting point. A further disadvantage consists in that overpacks generally can be formed only over and above a certain number of dispatch items.

In addition to the overpacks described and in addition to the packaging material mentioned, there can be a multiplicity of packaging which basically could alternatively be used if they meet certain predefined guidelines and regulations. However, there is the technical requirement that packaging materials, after loading, have to be combined, for safeguarding during transportation, to form a transport unit, for example again in the form of known overpacks, with the requirements and disadvantages described above.

SUMMARY

It is against the above background that the embodiments of the present disclosure provide certain unobvious advantages and advancements over the prior art. In particular, the inventors have recognized a need for improvements in external packaging for safeguarding at least one package during transportation.

Although the embodiments of the present disclosure are not limited to specific advantages or functionality, it is noted that the present disclosure provides an external packaging for safeguarding at least one package during transportation, and a method for safeguarding at least one product during transportation, which at least substantially avoid the disadvantages of known external packagings and methods for safeguarding items during transportation. In particular, a cost-effective safeguarding of items during transportation, which contains significantly reduced packaging costs and a significantly reduced outlay of work for producing transport units, is provided. Furthermore, weight and volume of the external packaging can be significantly reduced in relation to known overpacks.

In accordance with one embodiment of the present disclosure, an external packaging for safeguarding at least one package during transportation is provided comprising at least one carrier element with an upper side and a lower side, wherein the carrier element comprises at least one base part directed toward the lower side and at least one border directed toward the upper side. The carrier element is at least partially open toward the upper side and is configured to carry the package, wherein the external packaging furthermore comprises at least one bag element configured to surround the package carried by the carrier element. The bag element is arranged relative to the carrier element in such a manner that the bag element, at least in a maximum filling state, extends on the upper side of the carrier element beyond the border of the carrier element. The carrier element has at least two handles and the bag element has at least two openings. The bag element at least partially surrounds the carrier element, wherein the handles of the carrier element are accessible through the openings of the bag element.

In accordance with another embodiment of the present disclosure, a method for safeguarding at least one product during transportation is provided, the method comprising forming at least one package by at least partially surrounding a product with at least one packaging material. The method further comprises accommodating the package in an external packaging for safeguarding the at least one product during transportation, wherein the external packaging comprises at least one carrier element with an upper side and a lower side. The carrier element further comprises at least one base part directed toward the lower side and at least one border directed toward the upper side. The carrier element is at least partially open toward the upper side. The at least one package is introduced into the external packaging in such a manner that the package is carried by the carrier element. The external packaging furthermore comprises at least one bag element, wherein the package is introduced into the bag element in such a manner that the bag element surrounds the package carried by the carrier element, wherein the bag element extends on the upper side of the carrier element beyond the border of the carrier element. The carrier element has at least two handles and the bag element has at least two openings. The bag element at least partially surrounds the carrier element, wherein the handles of the carrier element are accessible through the openings of the bag element.

These and other features and advantages of the embodiments of the present disclosure will be more fully understood from the following detailed description taken together with the accompanying claims. It is noted that the scope of the claims is defined by the recitations therein and not by the specific discussion of features and advantages set forth in the present description.

BRIEF DESCRIPTION OF THE DRAWINGS

The following detailed description of the embodiments of the present disclosure can be best understood when read in conjunction with the following drawings, where like structure is indicated with like reference numerals and in which.

Figure 1A:
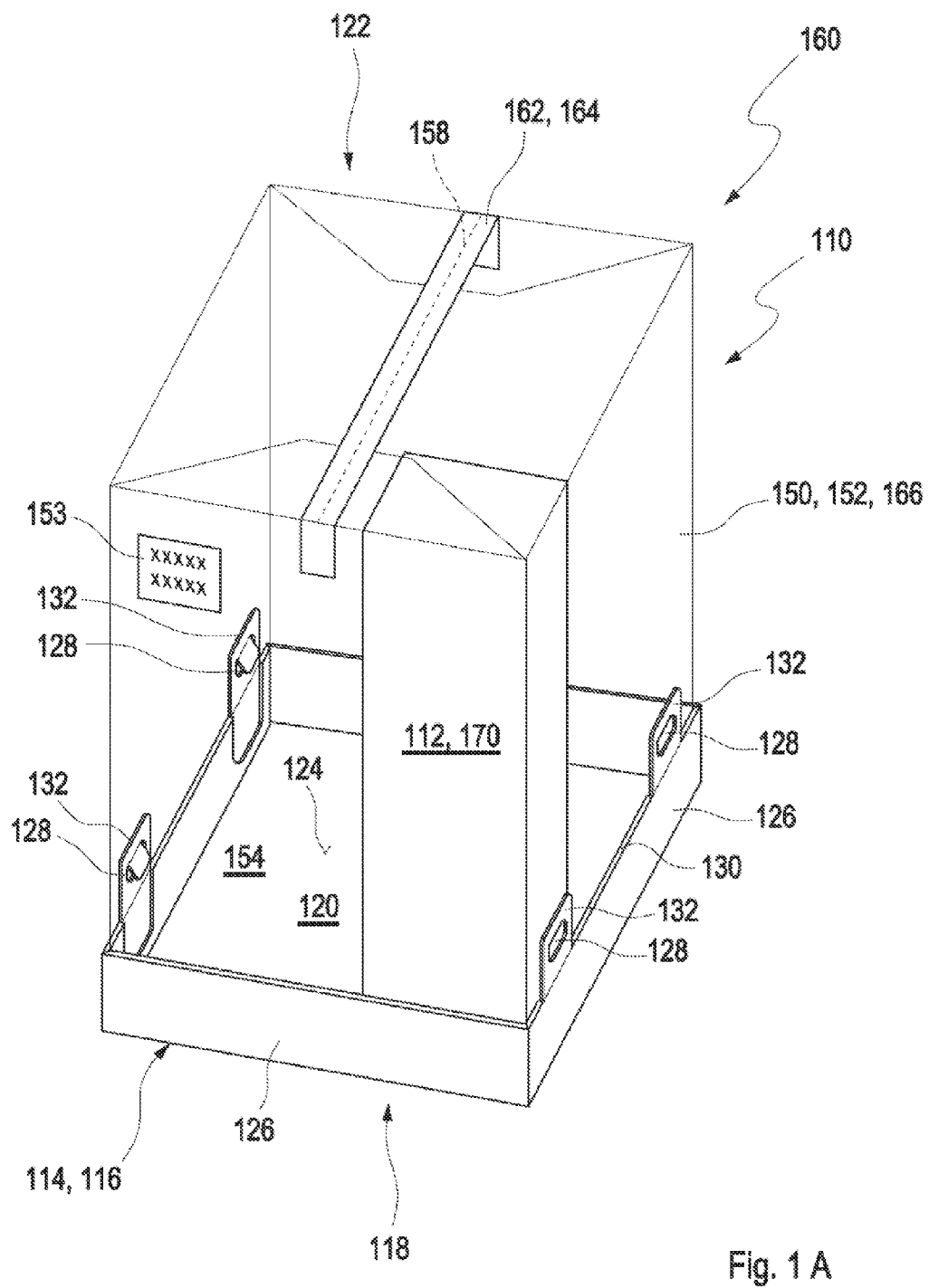
FIGS. 1A to 1C show various views of an exemplary embodiment of an external packaging according to the present disclosure.

Skilled artisans appreciate that elements in the figures are illustrated for simplicity and clarity and have not necessarily been drawn to scale. For example, the dimensions of some of the elements in the figures may be exaggerated relative to other elements to help improve understanding of the embodiment(s) of the present disclosure.

DETAILED DESCRIPTION

In accordance with one embodiment of the present disclosure, an external packaging for safeguarding at least one package, typically at least two packages, during transportation is provided. In this case, a package should be understood as meaning a unit consisting of at least one packaging material and at least one product entirely or partially accommodated in the packaging material. In particular, the product may be dangerous goods. The packaging material may be, in particular, a carton or else another type of packaging means. Combinations of different packaging materials for the package are also possible.

A transportation safeguard, in particular the operation of safeguarding items during transportation, should be understood in general as meaning a preparation of the at least one package, typically the at least two packages, owing to which the at least one package can be transported on land, sea, in air traffic or in a combination of the transportation means mentioned. In particular, the transportation safeguard is intended to be configured in such a manner that it meets the customary transportation regulations, for example for dangerous goods meets the above-mentioned IATA regulations for air traffic.

A transportation unit is understood below as meaning the unit which comprises the at least one package, typically the at least two or more packages, and the external packaging. The transportation unit can in particular ultimately be configured as a single piece and treated as a virtually individual part, for example when loading or unloading a freight compartment or for storage. In particular, the safeguarding of items during transportation can be undertaken in such a manner that a plurality of packages are combined within the external packaging to form the transportation unit.

Within the context of the present disclosure, an external packaging should be understood as meaning a packaging which at least partially, typically completely, surrounds the at least one package, typically the at least two or more packages, in the transportation unit. In particular, the external packaging can ensure that the packages are safeguarded against falling down and/or slipping within the transportation unit. Furthermore, the external packaging can ensure protection of the at least one package against external influences, for example protection in relation to dust, soiling, moisture, mechanical influences or other types of influences which could impair the at least one package and/or the product.

The external packaging has at least one carrier element, typically precisely one carrier element, with an upper side and a lower side. In this case, a carrier element should be understood as meaning an element which is designed/configured to receive the at least one package, for example by the latter being placed directly or indirectly onto the at least one upper side. The carrier element is intended in particular to have mechanical stability such that the carrier element permits packages which are accommodated on the carrier element to be raised, at least up to a certain maximum load-bearing capacity, without the carrier element itself being damaged, for example tearing or breaking. The carrier element can be designed in particular to be substantially dimensionally stable, i.e., configured in such a manner that the carrier element is not deformed up to a predefined maximum load-bearing capacity, for example up to a maximum of about 75 kg or up to a maximum of about 50 kg, in such a manner that the carrier element breaks or tears because of excessive deformation.

The at least one carrier element can exhibit at least one base part directed toward the lower side and at least one border directed toward the upper side. The base part is designed/configured, for example, in such a manner that the base part can be directly or indirectly loaded with the at least one package, typically the plurality of packages. For example, the base part can be designed/configured as a flat part, for example with a rectangular area. In particular, the base part can be designed/configured as a plate-like part, with a thickness which falls by at least a factor of 10, typically by at least a factor of 100, below the lateral extent thereof. In particular, the base part can be designed as a rectangular, plate-like part, for example with a thickness of at maximum about 50 mm, typically at maximum about 30 mm, in particular at maximum about 20 mm and more typically at maximum about 10 mm.

Furthermore, the carrier element has the at least one border directed toward the upper side. The border, which typically at least partially encircles the base part, is designed/configured in such a manner that the carrier element is at least partially open toward the upper side and is further designed/configured to directly or indirectly carry the package. Accordingly, the carrier element can be designed/configured in particular as what is referred to as a tray, i.e., as an open packaging means, which typically has a tray form, with a typically, but not necessarily, completely encircling border protruding upward, toward the upper side, and a base part which is typically surrounded by the border. The border can have, for example, a height perpendicularly to the surface extent of the base part, that is at maximum about 300 mm, typically at maximum about 200 mm, in particular at maximum about 150 mm. In particular, the border may have a height of about 50 mm to about 200 mm, in particular a height of about 100 mm to about 150 mm, and more typically a height of about 120 mm.

For the safeguarding of items during transportation, the carrier element may be used in particular instead of a transportation pallet or as a transportation pallet without a transportation pallet of a conventional type, for example a Euro-pallet or World-pallet, additionally being required. Use of the external packaging without an additional transportation pallet is therefore typical. The external packaging may therefore be used in particular within the scope of a transportation unit which, in addition to the packages and the external packaging, does not have any further transportation pallet, in particular a Euro-pallet and a World-pallet. Of course, however, the external packaging according to the disclosure can additionally be placed onto a pallet with that side of the base part which is directed toward the lower side.

In addition to the at least one carrier element, the external packaging furthermore comprises at least one bag element, typically precisely one bag element. In this case, a bag element is understood as meaning a deformable element with at least one interior space, typically precisely one interior space, which is at least partially surrounded by a bag wall of the bag element. The bag wall is typically designed to be thin and easily deformable, and therefore, for example, the shape of the interior space can be adapted within certain limits to a filling of the interior space. For example, the bag wall can have a wall thickness of less than about 2 mm, typically less than about 1 mm, and more typically less than about 0.5 mm or even less than about 0.2 mm. For example, the bag wall can have a wall thickness of between about 0.1 mm and about 2 mm, in particular between about 0.2 mm and about 1.5 mm, and more typically between about 0.3 mm and about 1.0 mm. In particular, the bag wall can be designed/configured to be single-layered, but multi-layered bag walls, for example laminates, are also usable. In particular, the bag wall can be a continuous bag wall which is manufactured, for example, from a continuous piece and/or which has been connected to form a continuous piece, for example by adhesive bonding or welding of opposite edges.

The bag element has at least one opening, typically precisely one opening, which is typically designed/configured so as to be closable and through which the bag element can be filled and/or emptied. For example, the bag element may be of tubular design, with a round, oval or polygonal tube cross-section, wherein the opening is arranged at one end of the tube and wherein the opposite end of the tube is designed/configured to be closed. The bag element therefore differs, for example, from wrapped film packagings which in accordance with the present disclosure are generally not intended to be covered by the term bag element.

The bag element, for example, may have precisely one interior space which is surrounded by the bag wall, wherein the bag wall typically has precisely one opening, for example an opening with a round, oval or polygonal cross-section, through which, for example, the at least one package and typically also, as explained in more detail below, the at least one carrier element can be introduced into the interior space. The external packaging can then be configured, for example, in such a manner that, in a filled state, for example in a state filled to the maximum, the opening is arranged at an upper end of the bag element, whereas the at least one package and optionally the at least one carrier element rest directly or indirectly on a bag element base opposite the opening in the interior space of the bag element.

The bag element is designed/configured to surround the package carried by the carrier element. The bag element typically completely surrounds the package, but a partial surround is in principle also possible. The bag element is arranged relative to the carrier element in such a manner that the bag element, at least in a maximum filling state of the bag element, extends on the upper side of the carrier element beyond the border of the carrier element. In particular, the bag element can be closed in the state filled to the maximum, for example by the opening of the bag element being closed by an adhesive bond, in particular by one or more slip-over elements. In other words, the bag element, typically at least in a state of the external packaging in which the latter is filled to the maximum, for example in a completely filled state of the external packaging, is intended to protrude upward over the border of the carrier element, toward the upper side, for example by at least the height of the border, typically by at least twice the height of the border and, more typically, by at least three times or at least four times the height of the border. For example, as explained above, the border of the carrier element may have a height which does not exceed about 200 mm, typically does not exceed about 150 mm or even does not exceed about 120 mm.

A maximum filling state or a state filled to the maximum is understood within the context of the present disclosure as meaning a state, in which at least one package is introduced into the bag element in such a manner that an overall height of the contents of the bag element has reached a maximum height that can be occupied in the bag element without the bag element being stretched in a direction perpendicularly to the surface of the base part, in particular without the bag element tearing. In other words, the bag element is intended to be designed/configured in such a manner that the bag element permits one or more packages to be accommodated in the bag element above the base part of the carrier element in such a manner that an upper side of the packages, which upper side protrudes the furthest over the carrier element and therefore typically determines the maximum height of the packages in the transportation unit, is arranged above an upper edge of the border of the carrier element.

In a filled state, with one or more packages enclosed therein, the bag element can be at a height above the base part which may be at least about 200 mm, for example at least about 300 mm, at least about 500 mm or at least about 1000 mm. In particular, in the maximum filling state, the bag element can protrude on the upper side over an upper edge of the border of the carrier element by at least about 20 mm, typically at least about 50 mm, in particular by at least about 100 mm or even at least about 200 mm, more typically even by at least about 500 mm. However, the actual height of the external packaging with the at least one package enclosed therein is basically determined according to the type of packages. The upwardly open configuration of the carrier element, in combination with the flexible nature of the bag element, basically provides flexibility in the height of the external packaging upward. The external packaging can therefore be configured in particular in such a manner that the height thereof can be adapted flexibly to the at least one package and/or to a varying number of packages, at least up to a predefined maximum height and/or predefined maximum number of defined packages, wherein the bag element can always at least partially overlap an upper side of the uppermost package.

The at least one carrier element and the at least one bag element can generally be arranged in different ways with respect to one another, which ways may also be combined, for example by a plurality of bag elements being provided.

In a first way, the bag element can be introduced, for example, into the carrier element in such a manner that a base of the bag element rests on the base part of the carrier element. In other words, for example, a tray which forms the carrier element can serve as a carrier for the bag element. Said resting can be undertaken loosely, wherein the bag element is not fixed to the carrier element. Alternatively, as explained in more detail below, the bag element may also be fixed to the carrier element, for example by an adhesive bond and, in particular, by means of at least one double-sided adhesive strip.

In a further, alternatively or additionally usable way, the bag element and the carrier element can also be arranged with respect to each other in such a manner that the bag element completely or partially surrounds the carrier element. This may be undertaken in particular in such a manner that the base part of the carrier element rests on a base of the bag element in the interior of the bag element. In this case, the base part of the carrier element can rest loosely on the base of the bag element, i.e., without fixing, but, alternatively, fixing of the carrier element to the bag element is also possible, for example by the carrier element and, in particular, the base part of the carrier element being adhesively bonded to the bag element, for example by one or more double-sided adhesive strips. However, loose resting of the carrier element on the bag element, for example on the base of the bag element, is typical.

The configuration in which the bag element entirely or partially surrounds the carrier element affords in particular that the bag element can simultaneously provide protection against water for the carrier element and for the at least one package. In this manner, as is explained in more detail below, the carrier element can be produced, for example, entirely or partially from at least one material which basically does not have to have any exacting requirements in respect of hygrostability. For example, the carrier element may be produced entirely or partially from a carton material, for example from corrugated board. A further feature of surrounding the carrier element by the bag element consists in that, in principle, the carrier element does not need to be fixed to the bag element, or vice versa. Since the bag element entirely or partially surrounds the carrier element, the carrier element can be fitted loosely into the bag element without the carrier element, including the at least one package, being able to slip into the interior space. In particular, in the closed state of the bag element, in which, for example, the opening of the bag element is closed by one or more adhesive strips or in another manner, the bag element and the carrier element and optionally the at least one package are connected to one another.

The carrier element and the bag element can in particular form a unit. As already explained above, the carrier element and the bag element may be arranged loosely with respect to each other, but may also be connected to each other, for example by an integrally bonded connection, typically an adhesive bond. For example, in the first way described above, an adhesive bond can be provided between the base part of the carrier element and the base of the bag element, for example by such an adhesive bond being applied on a lower outer side of the base of the bag element. The adhesive bond can be ensured, for example, by an adhesive and/or an adhesive strip, for example a double-sided adhesive tape. In the second way described above, at least one adhesive means can be introduced, for example, in the interior of the bag element, and can be used to adhesively bond that side of the base of the bag element which is directed toward the interior space of the bag element to a lower side of the carrier element, for example a lower side of the base part of the carrier element. Said adhesive means may in turn comprise, for example, at least one adhesive and/or at least one adhesive strip, for example at least one double-sided adhesive tape. However, as an alternative to an integrally bonded connection between the carrier element and the bag element, simple resting of the bag element on the carrier element, or vice versa, may be provided without there being a fixed connection between said elements. As an alternative again, other types of connections may also be provided, for example frictional and/or form-fitting connections, for example via one or more clips. As described in detail further below, a form-fitting connection may also be undertaken by optional handle tabs of the carrier element, which handle tabs protrude through handle openings, which are provided therefor, in the bag element and therefore bring about a form-fitting connection between carrier element and bag element.

The external packaging may in particular have a plurality of states. For example, the bag element can be brought into at least one receiving state, wherein, in the receiving state, an opening of the bag element can be opened up for filling with the at least one package. For example, the receiving state may be configured in such a manner that, in said receiving state, one or more bag borders of the bag element is or are turned over in order to open up the opening of the bag element for filling with the at least one package.

The bag element may have at least one dispatch state. In particular, the bag element can be brought into at least one dispatch state in which at least one package is accommodated in the bag element, wherein the package is typically completely surrounded by the bag element.

For example, a transition can be made between the above-described receiving state with the turned-over bag border into the dispatch state by the bag border being turned up after the at least one package is introduced into the interior space of the bag element and being fastened over an upper side of the at least one package, typically the plurality of packages. Subsequently, the opening of the bag element may be, for example, closed, for example by adhesive bonding and/or by using one or more closure elements, for example one or more adhesive strips, adhesives, frictional connecting elements, form-fitting connecting elements or any combinations of said options. The receiving state, in which the bag border of the bag element is turned over, may also be, for example, a delivery state of the external packaging, in which said external packaging is provided.

As described above, the package may in particular comprise at least one packaging material and at least one product at least partially, typically completely, surrounded by the packaging material. The packaging material may comprise in particular a carton and/or a carton material. However, in principle, other types of packaging materials are also conceivable.

Further possible refinements relate to the carrier element. As described above, an external packaging which is used in such a manner that an additional transportation pallet does not have to be used is typical. Accordingly, the carrier element can be designed/configured in particular to be substantially dimensionally stable under customary forces occurring during transportation. The carrier element can typically be at least partially produced from a material selected from the group consisting of: a carton material; a plastics material, in particular a foamed plastics material; and a wood material. In this case, single-layer or else multi-layered materials can be used, for example composite materials or laminate materials. The use of a carton material is particularly typical. The carrier element can be produced in particular from a blank of carton material, for example by simple folding and/or bending. For example, the blank may be a blank of flat carton material which can have a plurality of folding lines and optionally one or more perforations. It is particularly typical if the carrier element is produced from a material which has a thickness of not more than about 50 mm, particularly typically of not more than about 30 mm and in particular of not more than about 20 mm or even not more than about 10 mm. Such thicknesses can be realized, for example, for carton materials, for example corrugated board and/or other types of carton material.

The carrier element can in particular have at least two handles, typically handles arranged on at least two sides opposite each other. For example, the carrier element can in each case have at least two handles on two mutually opposite sides, wherein in each case a handle of the one side and a handle of the other side are opposite each other in pairs. In this case, handles can be provided on two sides or else, for example, on more sides, for example, four sides, of the carrier element.

The handles can be designed/configured in particular in such a manner that they do not obstruct an arrangement of a plurality of external packagings in the direct vicinity, and therefore a plurality of external packagings can be placed as tightly as possible next to one another. In particular, the carrier element can have at least two handle tabs, wherein the handles are arranged in the handle tabs. In this case, a handle tab should be understood as meaning a projection from the carrier element, which projection can be arranged rigidly or else flexibly with respect to the carrier element. For example, the handle tabs can be produced from the same material as the rest of the carrier element or else from a different material. In particular, the handle tabs can be produced from a carton material. The handle tabs can be designed/configured, for example, so as to be outwardly pullable and/or extendible from the border of the carrier element, in particular toward the upper side. For example, the border toward the upper side can have an upper edge, wherein handle tabs are outwardly pullable and/or are extendible from the edge, for example in such a manner that, after being pulled out and/or extended, the handle tabs protrude perpendicularly from the base part toward the upper side. In this manner, a plurality of external packagings can be placed as tightly as possible next to one another even with the handle tabs pulled out and/or extended. In particular, the handle tabs can be configured in such a manner that, in the pulled-out state, said handle tabs do not protrude laterally over the border, and therefore, for example, the dimensions of the carrier element are not increased in a plane parallel to the base part by the handle tabs being pulled out and/or extended.

The handles, for example the handle tabs, may in principle be produced from the same material as the rest of the carrier element, for example from a carton material, such as, for example, corrugated board. Other configurations are also possible. Furthermore, the handles, in particular the handle tabs, can in each case have one or more handle reinforcements increasing the stability of the handles. For example, handle reinforcements, for example consisting of a plastics material and/or of an adhesive tape, which are applied, for example adhesively bonded, to the material of the carrier element can be provided on one, more than one or on all of the handles, wherein the handle reinforcements can completely or partially surround the openings of the handles, in particular of the handle tabs.

As described above, the carrier element and the bag element can be arranged with respect to each other in different ways which are also combinable with one another. If the external packaging is configured in such a manner that the bag element at least partially, typically completely, surrounds the carrier element, said configuration may nevertheless be combined with the above-described configuration of the at least two handles. The bag element may thus, for example, have at least two additional openings which—in contrast to the bag element opening usable for loading the bag element—can also be referred to as handle openings, wherein the handles, in particular the handle tabs, are accessible through said handle openings. Said handle openings can be configured, for example, as slots, round or angular openings in the bag element. In particular, the slots can be of a length which corresponds to a length of the handles, in particular the handle tabs. If the bag element is of tubular configuration, with a closed end serving as the base part of the bag element and an opening opposite the base part, the handle openings can be arranged, for example, in a side wall of the tubular bag element, which side connects the base part and the opening. The handle openings are therefore typically different from the opening responsible for the loading of the bag element. In this case, the openings or handle openings may also have different states and may be configured, for example, also as perforations. For example, at least two perforations can be provided in at least one bag wall of the bag element, typically in at least two mutually opposite bag walls. The at least two openings can typically correspond to the position of the handles of the carrier element.

The accessibility of the handles through the handle openings can be ensured in various ways. For example, it is possible to reach into the bag element through the openings. Alternatively or in addition, the handles, in particular the handle tabs, can also project out of the bag element through the openings and can thereby be accessible. For example, slots or perforations can be provided in elongated form, through which handle tabs can be folded outward and are thereby accessible for a user. The bag element can thereby completely or partially surround the carrier element and the at least one package, typically the plurality of packages, wherein, nevertheless, the handles of the carrier element are accessible for transporting the external packaging or the transportation unit. In particular, the bag element can be closed, and, in said closed state, the handles of the carrier element can be accessible through the handle openings, for example by, in said closed state of the bag element and/or of the external packaging, the handles of the carrier element projecting out of the bag element through the handle openings. For example, the at least one opening through which the bag element can be loaded with the packages can be closed, for example by means of at least one adhesive strip, for example when the external packaging is filled with packages. Nevertheless, in said loaded state, in which the opening is closed and in which at least one package is located in the external packing, the handles can be accessible through the handle openings, for example, by said handles and in particular the handle tabs projecting out of the bag element through the handle openings.

The openings through which the handles, in particular the handle tabs, are accessible, can be arranged in particular in a manner spaced apart from a base part of the bag element. For example, said spacing can be configured in such a manner that, when the bag element surrounds the carrier element and the carrier element rests on the base part of the bag element, the openings and/or the handles can be arranged away from a lower side of the carrier element, for example from a bearing surface of the carrier element, by at least about 100 mm, typically by at least about 150 mm. It can thereby be ensured, for example, that, at least at water levels of less than about 100 mm and typically of less than about 150 mm, water cannot penetrate through the openings into the interior of the bag element.

The configuration in which the handles, in particular the handle tabs, are accessible through the openings and, in accordance with one particular embodiment of the present disclosure, project out of the bag element, can be extremely advantageous in various respects. The openings or handle openings in the bag element typically always ensure that the handles of the carrier element are easily reached and, therefore, exhibit good maneuverability/handling. At the same time, in this configuration, the protective effect of the bag element, for example in relation to moisture, can be combined with the high carrying force of the carrier element. The bag element protects the carrier element, which can typically be produced from a carton material, from moisture, whereas the load of the at least one package can be carried as before by the carrier element. An additional pallet or plate on which the external packaging configured in such a manner rests and/or is transported is not required, since the external packaging can simply be transported by means of the handles. In contrast thereto, for example in the protection for pallets against flooding according to DE 76 02 244 U1, transportation in the closed state is possible only with difficulty, or not at all, since, for example, the pallet cavities provided for transportation of the pallet by means of a fork lift truck are also closed by the bag and are therefore no longer accessible.

The external packaging can be configured in particular in such a manner that the bag element has an opening extending toward the upper side. The opening can be configured in particular to be closable. For this purpose, the opening can have, for example, at least one adhesive tab, for example an adhesive tab which is closeable by an adhesive surface and/or an adhesive tape. For example, in order to close the opening, a bag wall border pointing toward the opening can be fastened over another border at the opening and adhesively bonded to said opening. Other types of the closable configuration of the at least one opening are also conceivable.

The bag element can be adapted in particular in terms of the dimensions thereof to the carrier element. The carrier element can have in particular a rectangular shape, wherein the bag element has four sides, wherein at least two mutually opposite sides have a width which corresponds at least to an edge length of the border. In this manner, for example, at least one bag element, but in principle also a plurality of bag elements, can be provided in a carrier element. Other configurations are in principle also possible.

The carrier element can be configured to be compatible, in particular in terms of the dimensions thereof, with customary pallets, for example Euro-pallets (i.e., EUR- or EPAL-pallets), International Organization for Standardization (ISO) sanctioned pallets, and/or World-pallets. For example, the carrier element can have a rectangular cross-sectional area, with two edge lengths, wherein each edge length can be selected independently of each other corresponding to an integral divisor of an edge length of a Euro-pallet or a World-pallet. For example, one side of the carrier element can be of a length which corresponds to 1/1, ½, ⅓, ¼, ⅕ or ⅙ of a first edge length of a standardized pallet, e.g., a Euro-pallet, a World-pallet, or an ISO pallet alternative, for instance. A second side of the carrier element may have, for example, an edge length which likewise corresponds to 1/1, ½, ⅓, ¼, ⅕ or ⅙ of a second edge length of such a standardized pallet. It is thereby possible, for example, for an external packaging according to an embodiment of the present disclosure to be introduced instead of or in addition to a transportation unit with a standardized pallet (e.g., Euro-pallet, World-pallet, or ISO pallet alternative) into a freight compartment and to be combined in any manner with conventional freight items.

Further possible configurations relate to the bag element. The bag element can thus comprise in particular at least one film bag, i.e., can be configured as a bag element with a film material as the bag wall. In particular, said film bag can be produced from a plastics material which can be designed/configured as a single layer or else in multiple layers. In particular, the plastics material can be selected from the group consisting of: polyethylene, polypropylene, polyethylene terephthalate, and combinations thereof. The plastics material may be configured to be transparent or else opaque. If multi-layered materials are provided, said materials may be produced, for example, by coextrusion. Furthermore, alternatively or in addition, use may in principle also be made of metallic film materials and/or paper film materials. For example, use may also be made of plastic and metal laminate materials, for example metallically coated film bags.

The external packaging can furthermore comprise at least one information label on an outer side of the bag element.

Said information label may comprise, for example, arrival information, content information, dangerous material information, handling information, destination information, manufacturer information, addressee information or other types of information. In contrast to conventional transportation units, said information labels, which may comprise, for example, one or more paper and/or plastics labels, therefore no longer necessarily have to be applied to the packaging materials; on the contrary, one or more information labels on an outer side of the bag element may suffice. This makes it possible to ensure, for example, identification as per the IATA guidelines. The at least one information label may be, for example, adhesively bonded on, but may in principle also be connected to the bag element in another manner, for example by a laminating method and/or other methods.

In accordance with another embodiment of the present disclosure, a method for safeguarding at least one product during transportation is provided. In this case, the product is at least partially surrounded by a packaging material, typically at least one carton. In this case, at least one package, for example a cuboidal package, is formed. For example, within the context of the present method, use may be made for the package in particular of packaging materials which have a cuboidal bearing surface, with two edge lengths which are in each case independently of each other integral divisors of an edge length of a bearing surface of the base part, for example of 1/1, ½, ⅓, ¼, ⅕, ⅙, ⅐, ⅛, ⅑ or ⅒.

The package is accommodated in an external packaging for safeguarding packages/products during transportation, in particular an external packaging according to one or more of the above-described configurations, and therefore reference may be made to the above description for possible configurations of the external packaging. The external packaging has at least one carrier element with an upper side and a lower side, wherein the carrier element comprises at least one base part directed toward the lower side and at least one border directed toward the upper side. The carrier element is at least partially open toward the upper side. The package is introduced into the external packaging in such a manner that said package is carried by the carrier element. The external packaging furthermore has at least one bag element, wherein the package is introduced into the bag element in such a manner that the bag element surrounds the package carried by the carrier element. The bag element extends on the upper side of the carrier element beyond the border of the carrier element.

Depending on the configuration of the arrangement of the bag element and of the carrier element with respect to each other, the at least one package can rest, for example directly, on the base part of the carrier element, wherein both the carrier element and the package are surrounded by the bag element. However, alternatively or in addition, the package can first of all also be introduced into the bag element and can then be mounted together with the bag element onto the base part of the carrier element. In this case, a plurality of packages can also be stacked in a plurality of layers one above another.

The proposed method is carried out in particular in such a manner that an additional transportation pallet is not used, and therefore, for example, the carrier element can rest directly on a floor of a freight compartment and/or on other transportation units. Furthermore, the method can be carried out in particular in such a manner that no further safeguarding means are provided in addition to the external packaging. In particular, strapping with one or more bands can be omitted, as can optionally also an edge protector.

The method, and the external packaging, can be used in particular for safeguarding dangerous goods during transportation. The method is in principle usable for any transportation routes, by land, sea or air.

The proposed external packaging and the proposed method have numerous advantages over known external packagings and methods. The external packaging can be used in particular as a small external packaging (Little Overpack, LOP). The carrier element can be designed/configured in particular as a portable basic pallet consisting of a stable carton material. As a result, the carrier element can be configured cost-effectively, in contrast, for example, to conventional transportation pallets made of a plastics material or wood material. The carrier element can also be designed, for example, to be foldable, and therefore, for example, a multiplicity of carrier elements can be supplied in a folded state, for example as flat cardboard pieces which are still to be folded, but are precut and/or preperforated. The bag element can be designed/configured in particular as a closable film bag which can be fixed, for example, to the carrier element or in which the carrier element can be fixed. In particular, a plurality of different, relatively small packages, in particular packages with dangerous goods cartons, can be combined in the film bag, thus enabling the costs and the handling complexity of dispatching said individual packages and in particular dangerous goods cartons to be significantly reduced.

In particular, by means of the external packaging, fixed strapping of the packages, for example strapping to a transportation pallet as a carrier, can be avoided. Furthermore, it is also possible to form small external packagings which can be designed cost-effectively and which, in particular can be designed cost-effectively owing to a possible disposable nature of the external packaging or of parts of same. Within the context of an external packaging according to an embodiment of the present disclosure, in particular a Little Overpack, a transportation pallet as load carrier can be omitted as a whole, thus enabling the costs of the pallet weight and the costs of the transportation pallet itself to be saved. The external packaging, in particular the Little Overpack, is usable flexibly for virtually all package sizes. This avoids a considerable planning complexity when putting the individual packages together. Whereas, in the case of external packagings nowadays, an expedient number of packages generally has to be provided, for example, at least one layer of cartons on a pallet, the external packaging according to the embodiments of the present disclosure provides the possibility of reacting flexibly also to small orders of two or more packages, for example, by the latter being dealt with as a Little Overpack. The external packaging can be used in particular also in a transportation unit in which a plurality of packages of different height rest next to one another in a plane, since the use of the bag element permits flexible adaptation of the surface of the transportation unit.

Furthermore, a combining of a plurality of packages in an external packaging according to at least one of the embodiments of the present disclosure can lead to a considerable cost reduction in respect of inspection costs. For example, each reduction of packages, in particular in air freight, leads to a reduction of inspection fees which, typically, in the case of dangerous goods inspection at airports, is currently, e.g., around 3 to 4 Euros per package.

Furthermore, the external packaging according to various embodiments of the present disclosure is generally simpler to handle than previous external packagings. The above-described outlay on work in the production of external packagings nowadays with transportation pallets as load carrier, onto which, according to a stacking plan, packages are placed and are wrapped with a film, can thus be significantly reduced. The use of a film for wrapping the transportation unit may be entirely omitted. The working sequence for producing an external packaging can be limited in particular to packages being packed into the bag element, in particular the closeable bag element, and said bag element subsequently being closed.

As described above, within the context of external packagings according to various embodiments of the present disclosure, transportation pallets in particular can be dispensed with. Nevertheless, the external packagings may additionally be used in combination with one or more e.g., standardized, transportation pallets, for example one or more Euro-pallets, one or more ISO sanctioned pallets, and/or one or more World-pallets. For example, one Euro-pallet may be used for two transportation units having external packagings according to an embodiment of the present disclosure. Such a combining of a plurality of transportation units with one external packaging in each case according to an embodiment of the present disclosure can in particular reduce the number of transportation pallets and/or the number of necessary storage compartments and/or depositing spaces in a truck and/or shipping container. Furthermore, the transportation weight and/or the transportation costs can be considerably reduced. The transportation is typically undertaken in such a manner that, in the case of the external packaging according to the present disclosure, the optional transportation pallets are not loaded on the transport at the same time, and therefore, for example, when transferring a transportation unit from one dispatch point to another, for example from a store onto a truck, the transportation pallet can remain in a fixed position and the transportation unit, for example, can be lifted from the transportation pallet. For said lifting, use may be made, for example, of the above-described optional handles. This enables, for example, the costs for the transportation pallets to be saved. Overall, the external packaging according to the present disclosure and the method according to the present disclosure can therefore bring about considerable amounts of saving in respect of transports costs, storage costs and working costs.

In order that the embodiments of the disclosure may be more readily understood, reference is made to the following examples, which are intended to illustrate the invention, but not limit the scope thereof.

Exemplary Embodiments

Figure 1B:
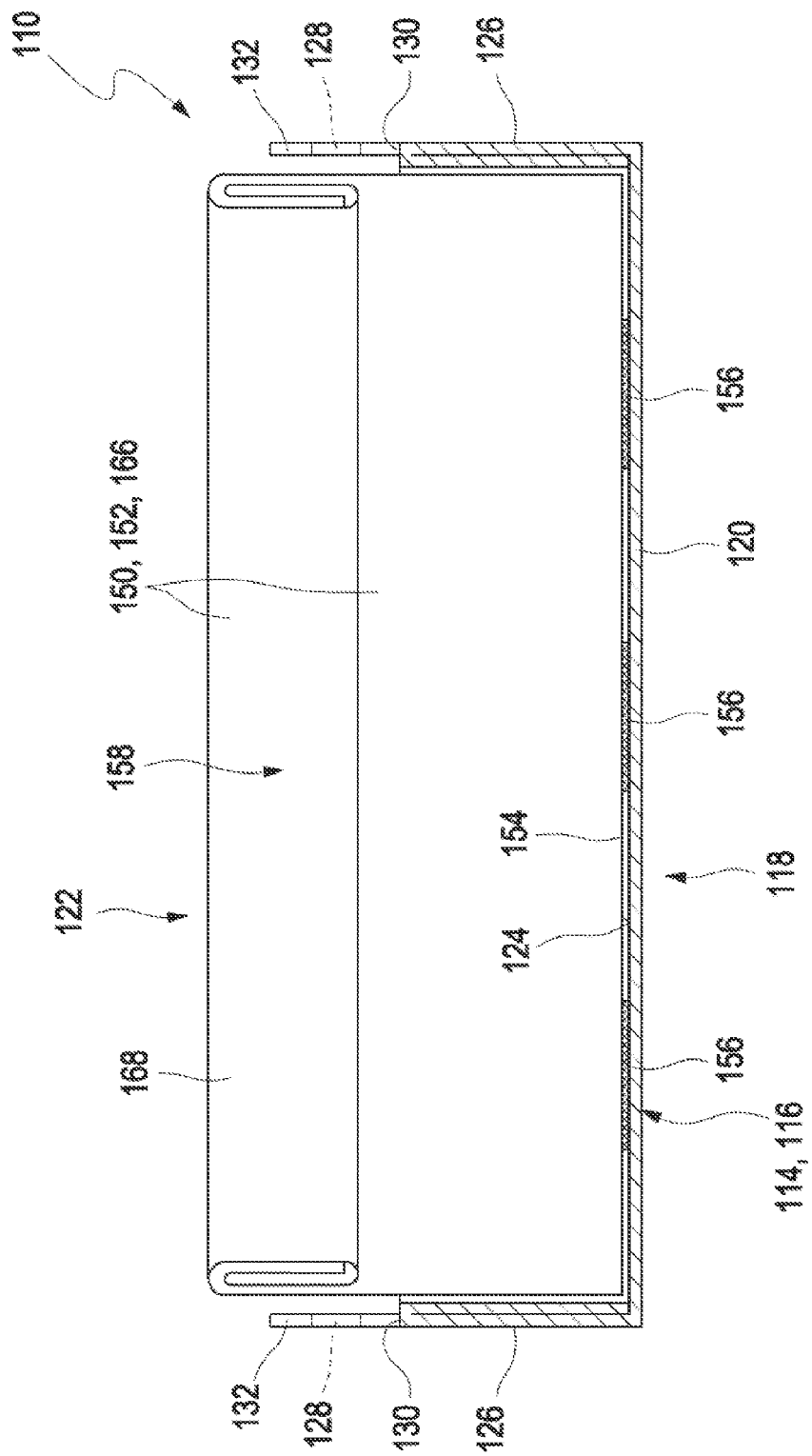
Figure 1C:
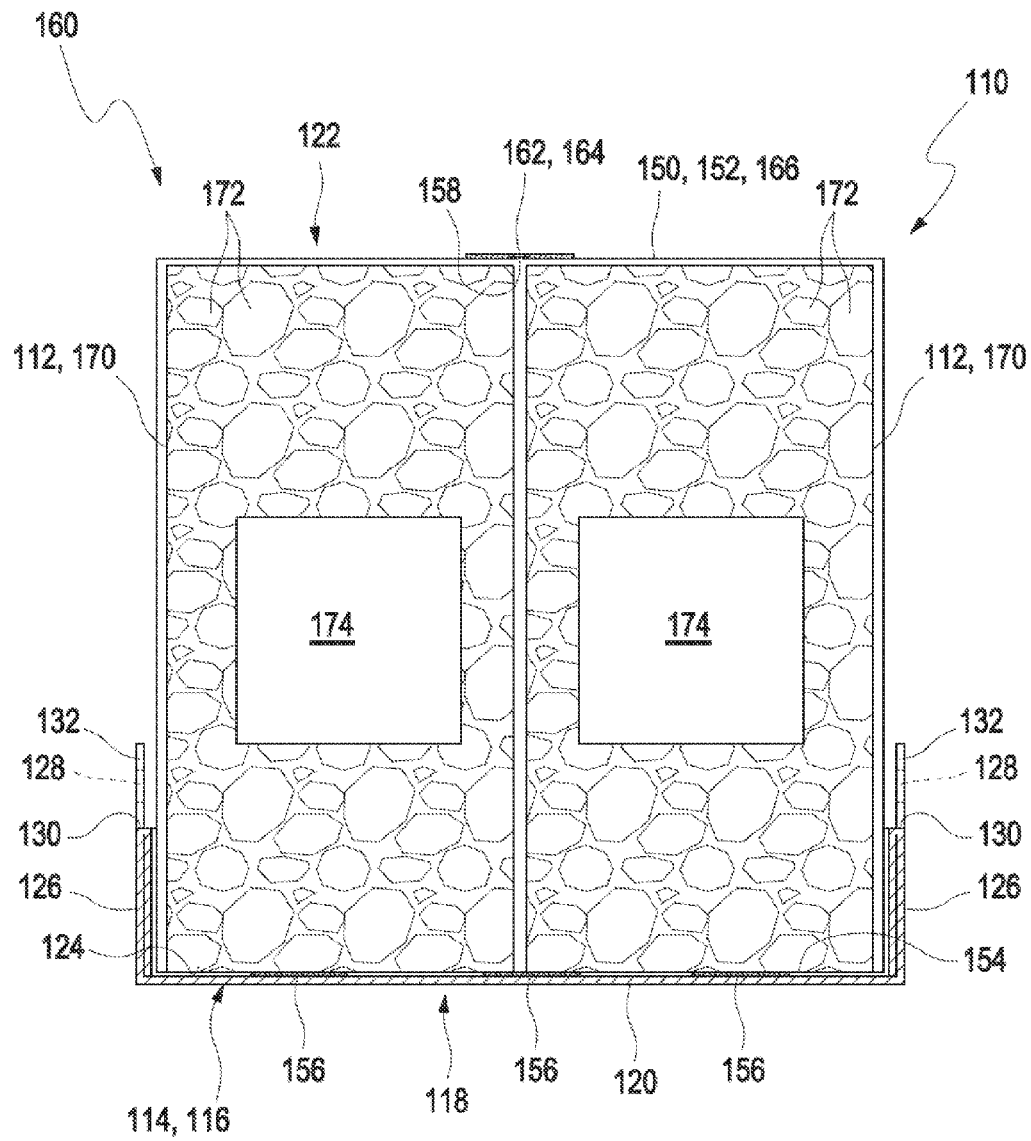

FIGS. 1A to 1C show various views of a first exemplary embodiment of an external packaging 110 according to the disclosure. FIG. 1A shows a perspective illustration of the external packaging 110, in a packed state. FIG. 1B shows a sectional illustration through the external packaging 110 in a receiving state without packages being accommodated. FIG. 1C shows a schematic sectional illustration of the external packaging 110 with packages 112 accommodated therein. A center plane of the arrangement in FIG. 1A has been selected as the sectional plane in FIGS. 1B and 1C. Reference is jointly made to the figures below.

In the exemplary embodiment illustrated, the external packaging 110 comprises a carrier element 114 in the form of a tray 116. Said tray 116 has, on a lower side 118, a base part 120 which, as emerges, for example, from FIG. 1A, has a bearing surface 124 directed toward an upper side 122 of the external packaging 110. Furthermore the carrier element 114 has a border 126 which is pulled upward and, in said exemplary embodiment, surrounds the base part 120 and extends toward the upper side 122. For example, the border 126 may be perpendicular to the bearing surface 124.

Furthermore, in the exemplary embodiment illustrated, the carrier element 114 has handles 128. Said handles 128 can be provided, for example on two mutually opposite sides, on an upper edge 130 of the border 126. The handles 128 can be provided, for example, in the form of handle tabs 132 or with handle tabs 132 of this type, which, by way of example in this exemplary embodiment, are outwardly pullable of the border 126 from the inside. The border 126 may be, for example, a doubly folded carton border, wherein the handle tabs 132 may be part of a layer of said double fold, with it being possible, for example, for a folded edge to be provided at the upper edge 130. The handle tabs 132 can extend, for example, perpendicularly upward out of the border 126, and therefore, for example, external packagings 110 standing closely next to one another do not obstruct one another and the external packagings 110 are nevertheless easily graspable.

Figure 2:
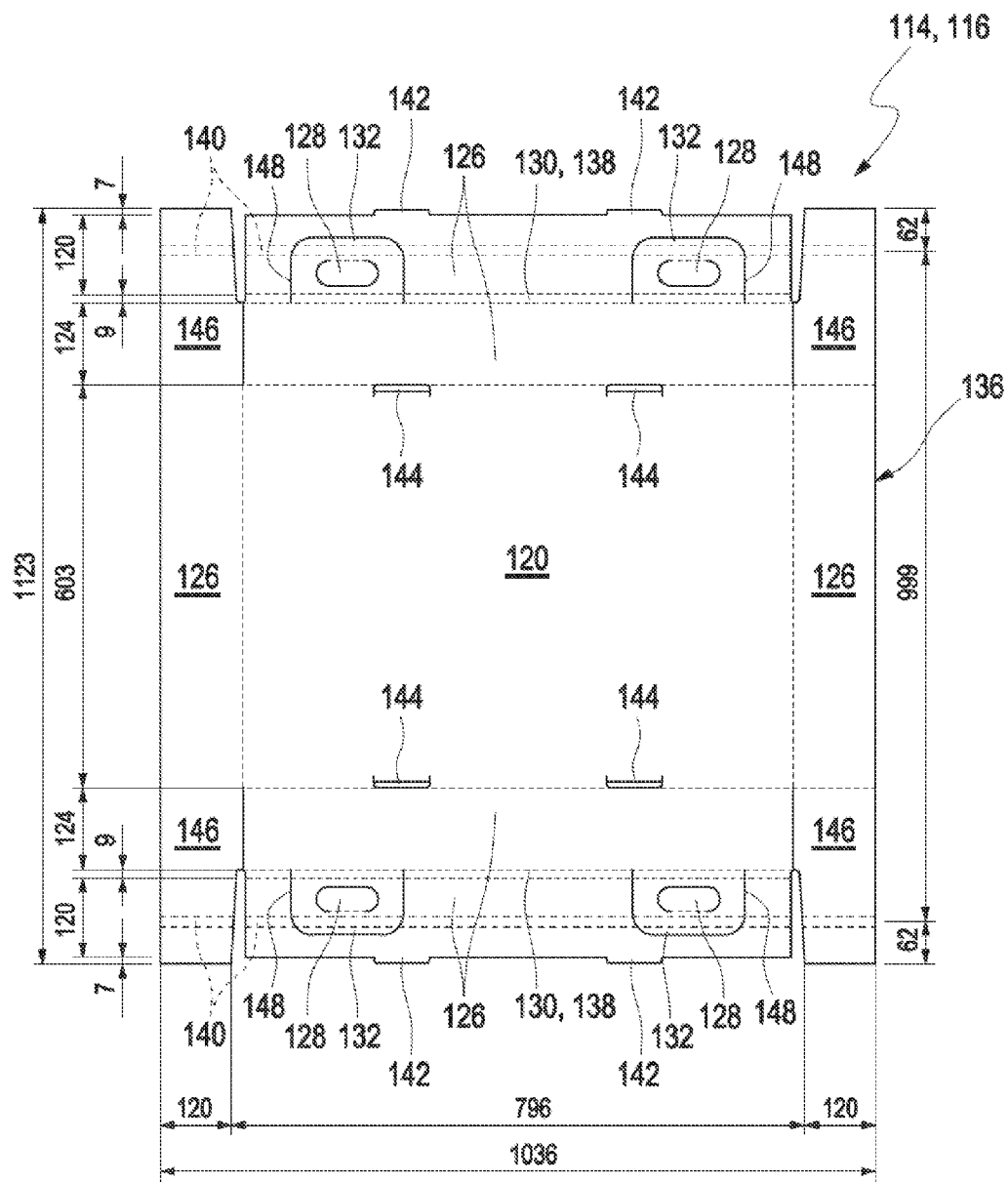
FIG. 2 shows an exemplary embodiment of a carrier element in accordance with the present disclosure.

The carrier element 114 can be produced, for example, from a carton material. FIG. 2, for example, shows, by way of example, a blank 136 of such a carrier element 114, which can be supplied, for example, as a flat piece of cardboard. The dimensions in said FIG. 2 are indicated in mm and should be understood merely as being by way of example. A multiplicity of different dimensions is also conceivable. It can clearly be seen in said blank that the border 126 in this exemplary embodiment or else in other exemplary embodiments can have a folding line 138, for example on at least two sides, on which the handles 128 are provided, said folding line subsequently forming the upper edge 130 and along which the border 126 can be turned over. Along said side of the border 126, it is optionally possible in the blank 136, and also optionally at other points of the blank 136, for, for example, at least one reinforcing band 140 to be provided. At the edges, the band 140 can have tabs 142 which, after corresponding folding at the folding line 138, can be inserted into corresponding openings 144 of the border of the base part 120. On those sides of the border 126 at which no handles 128 are provided, the border 126 can be configured in a simple manner, for example with tabs 146, which, when the blank 136 is folded up, can be inserted between the layers of the folded border 126 on the side on which the handles 128 are arranged. After the blank 136 is assembled to form the tray 116, according to FIGS. 1A to 1C, the handle tabs 132 can optionally be pulled out along a perforation 148. This results in a stable carrier element 114 which can typically be used on its own, but which may, in principle, additionally also be placed directly or indirectly onto a transportation pallet.

As is clear in particular from the perspective illustration according to FIG. 1A and from the sectional illustration in FIG. 1C, in the exemplary embodiment a bag element 150 is introduced in the interior of the carrier element 114. The bag element 150 is illustrated by way of example in FIG. 1A and transparently in order to clarify the design. However, other configurations are also possible. Instead of the typical configuration with an individual bag element 150, configurations having a plurality of bag elements 150 which can be arranged next to one another and/or which can be arranged nested in one another are also possible. The bag element 150 may comprise, for example, a flexible bag wall 152, with a base 154 which, in this exemplary embodiment, rests on the bearing surface 124 of the base part 120. The base 154 and the bearing surface 124 may optionally be connected to each other, for example in an integrally bonded manner, for example by means of one or more double-sided adhesive tapes 156, as indicated in FIGS. 1B and 1C.

At least one information label 153, which is indicated schematically in FIG. 1A, can in particular be applied on at least one outer side of the bag element 150, which side is visible to an observer or user. Said information label 153 may be, for example, adhesively bonded or laminated on the outer side.

That side of the bag element 150 which is directed toward the upper side 122 has an opening 158. In the filled state according to FIGS. 1A and 1C, in which one or more packages 112 are introduced into the external packaging 110, so as to produce a transportation unit 160, the opening 158 can be configured to be closed. Said closing can be undertaken, for example, by means of at least one closure element 162, in particular by means of at least one adhesive tab 164. Alternatively or in addition, an adhesive strip and/or another type of closure element 162 may be provided.

The bag element 150 may be configured, for example, as a film bag 166. For example, the film bag 166 may be a plastics film bag, for example made of polyethylene material and/or a different plastics material. Multilayered film bags 166 are also conceivable. Alternatively or in addition to plastics materials, it is also possible to use, for example in this or else in other exemplary embodiments, metallic materials and/or composite materials, for example plastics and metal composite materials, for example metallic coated plastics film bags. Various configurations are known in principle from the prior art.

FIG. 1B illustrates a receiving state of the external packaging 110, in which packages 112 have not yet been introduced into the external packaging 110. In said receiving state, for example, a bag border 168 directed toward the opening 158 can be turned over, wherein turning inward or else outward is possible. This opens up the opening 158, and therefore packages 112 (not illustrated in FIG. 1B) can be introduced into the opening 144, in one or more layers one above another. The bag border 168 can subsequently be turned up and fastened over the upper side of the packages 112, and the opening 158 can be closed.

It is apparent from the sectional illustration of the external packaging 110 and the transportation unit 160 according to FIG. 1C that the packages 112 themselves may each comprise at least one packaging material 170. Said packaging material 170 may comprise, for example, a carton, for example a square carton. Further packing materials, for example fillers 172, may be provided in the interior of the packaging material 170. Furthermore, at least one product 174, which is illustrated schematically in FIG. 1C, is in each case accommodated in the interior of the packaging material 170. The packing of a plurality of products 174 in the interior of a packaging material 170 is also conceivable. The products 174 may be, for example, of liquid, solid or gaseous nature and, for their part, may in turn have at least one primary packaging (not illustrated in FIG. 1C), for example a bottle, a bag, a carton, a blister pack or similar primary packagings. It is illustrated in FIG. 1C that only one layer of packages 112 is mounted onto the bearing surface 124 of the base part 120. However, configurations with mounting in multilayers are also conceivable. The illustration according to FIG. 1A, in which the bag element 150 is illustrated transparently by way of example, merely illustrates one package 112. Said illustration shows that, for example, the packages 112 may have edge dimensions in such a manner that an integral number of such packages 112 can be provided at least along one side, typically along both sides of the carrier element 114.

Figure 3A:
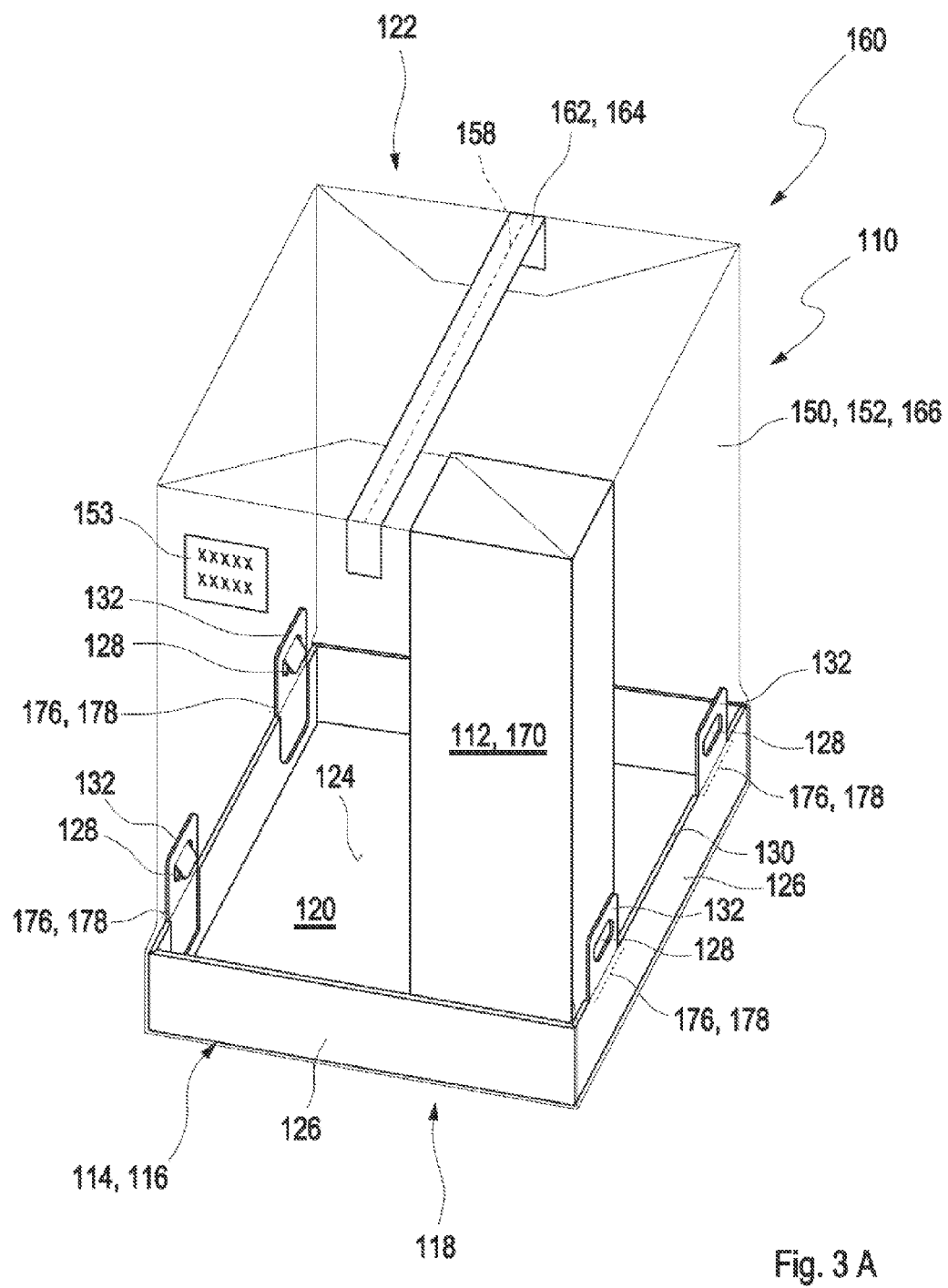
FIGS. 3A to 3C show various views of another exemplary embodiment of an external packaging according to the present disclosure.
Figure 3:
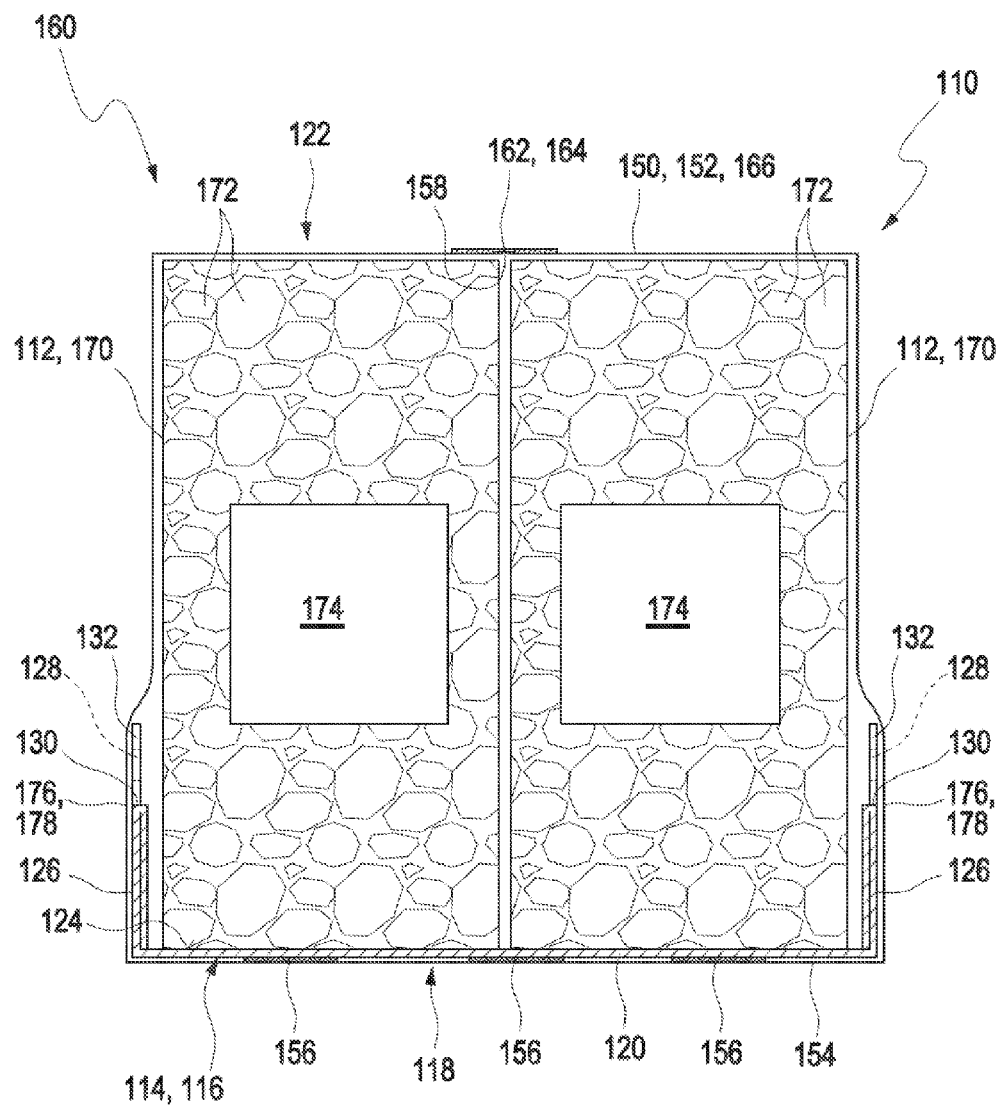

FIGS. 3A to 3C illustrate a further exemplary embodiment of an external packaging 110 according to the present disclosure, with regard to the configuration of which first of all reference can be substantially made to the description of the exemplary embodiment of FIGS. 1A to 1C and to the elements described there. Again, the bag element 150 is shown by way of example in FIG. 3A and transparently, in order to simply the illustration, without restricting further embodiments.

In contrast to the configuration according to FIGS. 1A to 1C, in the external packaging 110 according to FIGS. 3A to 3C the bag element 150 and the carrier element 114 are, however, arranged with respect to each other in such a manner that the bag element 150 surrounds the carrier element 114. Said surrounding is undertaken in such a manner that the base part 120 of the carrier element 114 rests on the base 154 of the bag element 150. One or more adhesive tapes 156 may again optionally be provided between the lower side of the base part 120 and the base 154 of the bag element 150 in order to fix the bag element 150 relative to the carrier element 114.

In a receiving state which is illustrated in FIG. 3B, basically corresponds to the receiving state according to FIG. 1B and in which, for example, packages 112 (not illustrated in FIG. 3B) can be introduced into an opening 158 of the bag element 150 and at the same time mounted onto the bearing surface 124 of the carrier element 114, a bag border 168 of the bag element 150 may optionally again be turned over, for example outward, as illustrated in FIG. 3B.

The bag element 150 may optionally comprise one or more openings 176 which are indicated symbolically in FIG. 3A. The handles 128 and optionally the handle tabs 132 can be accessible to the user through said openings 176. Said openings 176 may comprise, for example as can be seen in FIG. 3A, perforations 178 in the bag wall 152, said perforations being arranged at locations at which the handles 128 are accessible through said perforations 178, optionally after tearing open same. The handle tabs 132 can optionally be folded outward though said openings 176, and therefore, for example, the handle tabs 132 project outward from the interior of the bag element 150 through the openings 176, which is not illustrated in the figures.

By contrast to the configuration according to FIGS. 1A to 1C, in the configuration according to FIGS. 3A to 3C the tray 116 can thus be located in the interior of the bag element 150. The bag element 150, which may be, for example, a paper or plastic bag, can be configured with the perforations 178, through which the handle tabs 132, for example as carrying handles, may, when required, be led out of the bag element 150 (not illustrated here) or through which the handle tabs 132 may be grasped. The situation which is illustrated in FIG. 3B and according to which the bag element 150 can be configured to be turned up is not absolutely necessary, in particular in this exemplary embodiment, in which the carrier element 114 is introduced into the bag element 150, since the stiffness of the carrier element 114 typically holds open the opening 158 of the bag element 150 for loading with packages 112. After the loading operation, the bag element 150 can be fastened over the packages 112 and optionally closed, as FIG. 3A shows.

Figure 4:
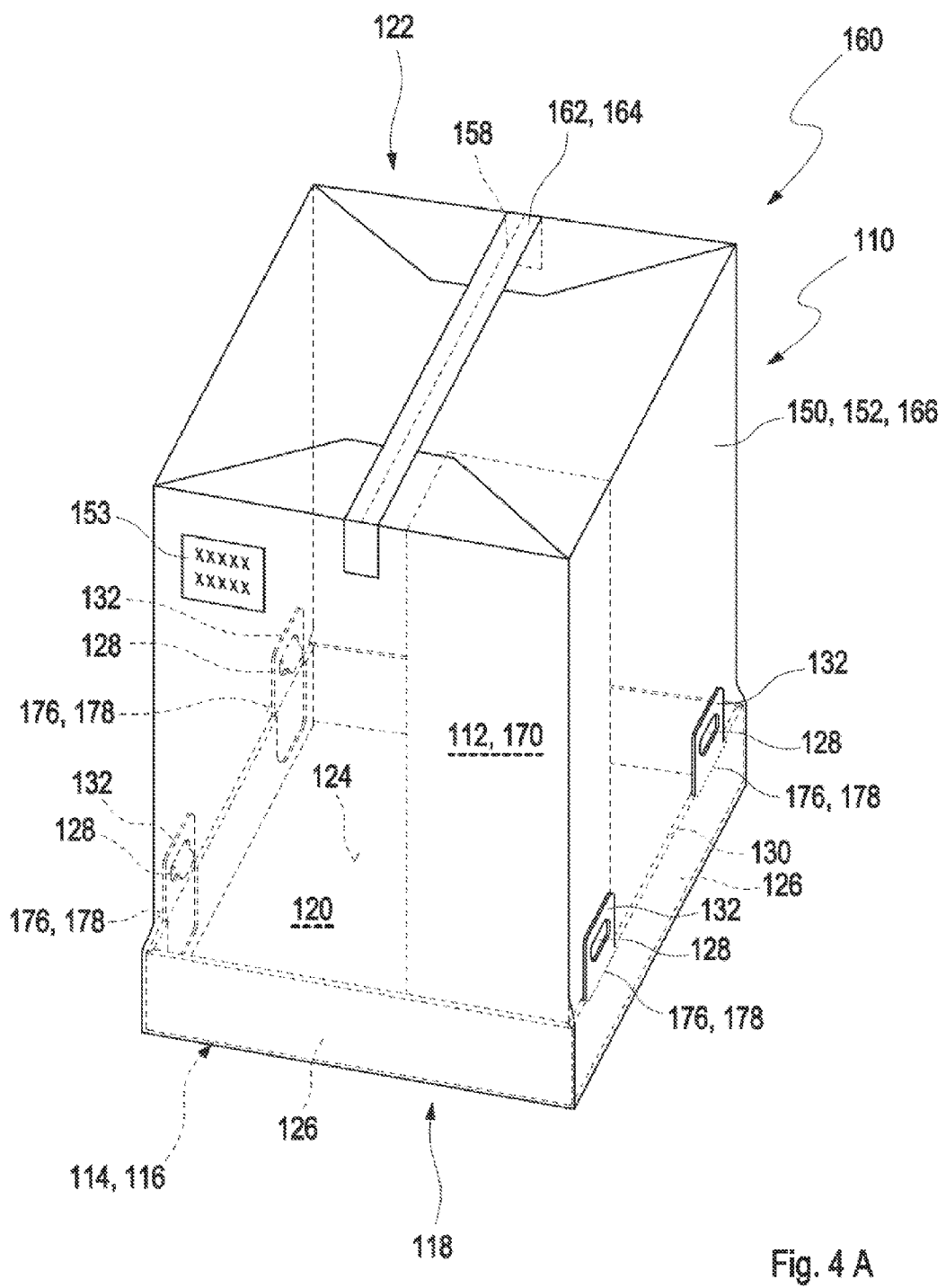
FIGS. 4A to 4C show various views of yet another exemplary embodiment of an external packaging according to the present disclosure with handles projecting outward through openings in a bag element.
Figure 4B:
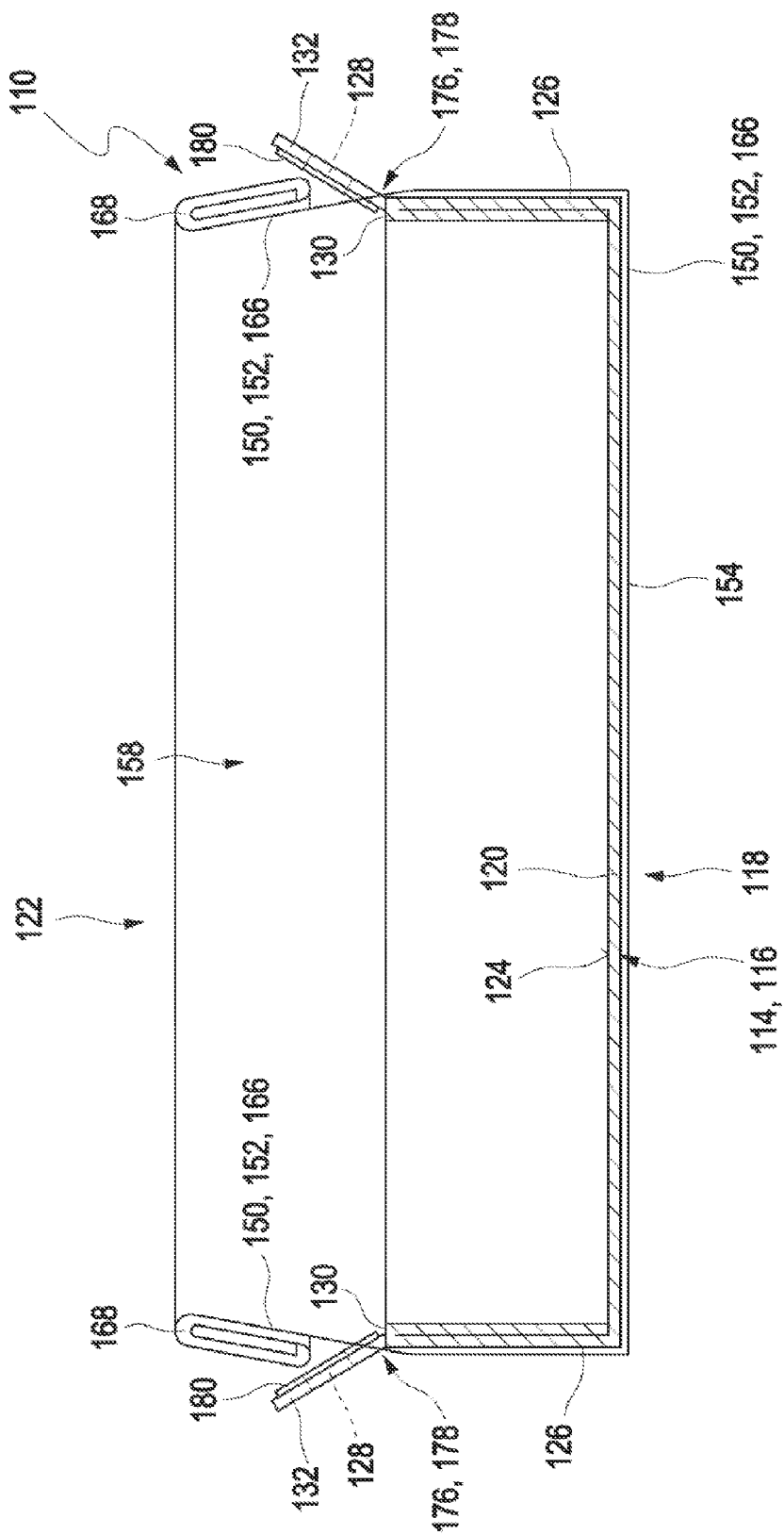
Figure 4:
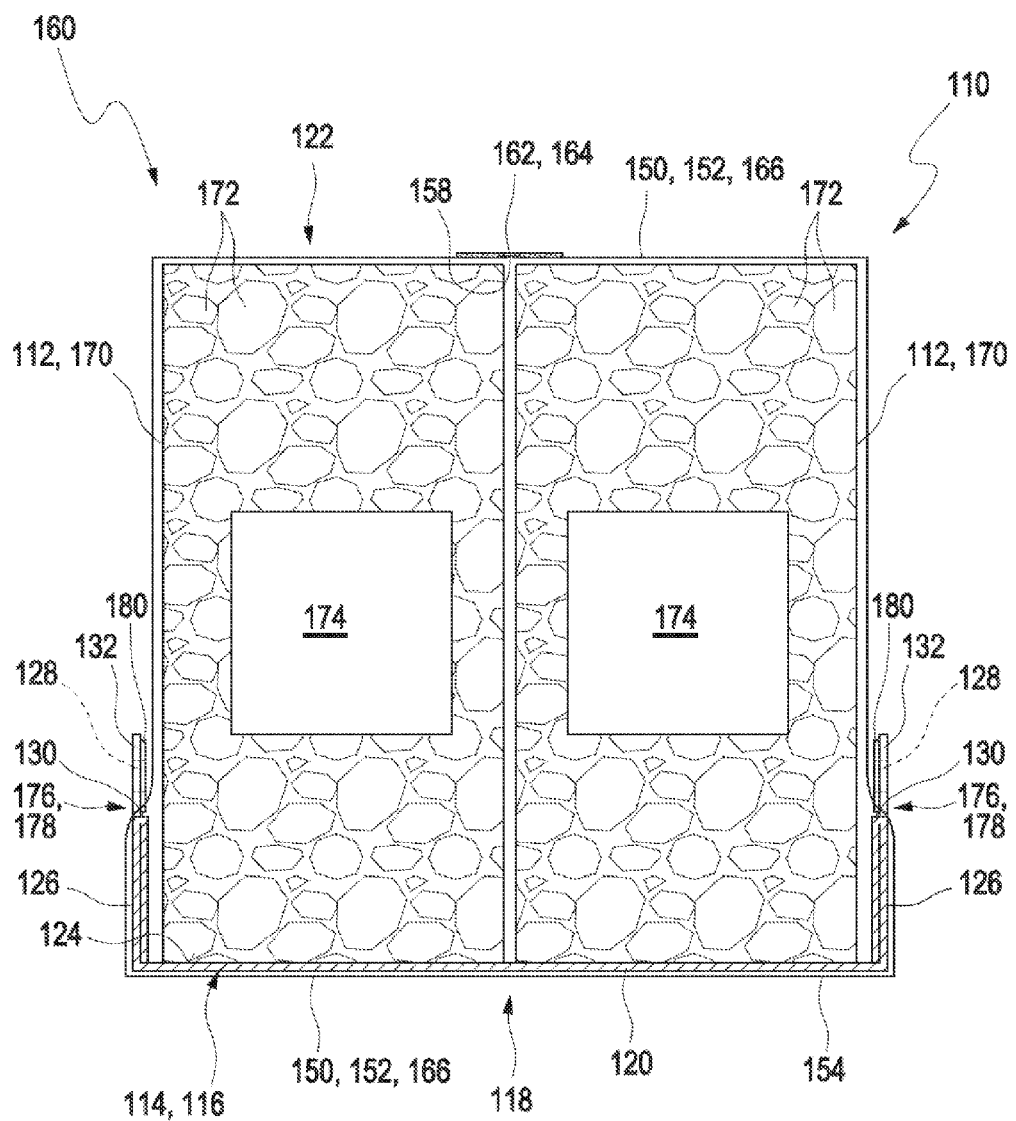

FIGS. 4A to 4C illustrate various views and various states of a third exemplary embodiment of an external packaging 110 according to the present disclosure. The exemplary embodiment largely corresponds to the exemplary embodiment according to FIGS. 3A to 3C, and therefore reference can be substantially made to the above description of said figures. Again, in this exemplary embodiment, a carrier element 114 together with a package 112 mounted thereon (it also being possible for a plurality of packages to be provided) is introduced into a bag element 150 such that the carrier element 114 is entirely or partially surrounded by the bag element. Whereas, in FIG. 3A, the bag element 150 is illustrated transparently, which does not necessarily have to indicate transparent properties of the bag element 150, in the exemplary embodiment according to FIG. 4A the carrier element 114 and the package 112 are illustrated with dashed lines in the illustration in order to more greatly emphasize the arrangement of said elements in the interior of the bag element 150. Otherwise, the illustration in FIG. 4A corresponds to the illustration in FIG. 3A. Whereas FIG. 4A shows a perspective illustration of the external packaging 110 in a filled and closed state, FIG. 4B, analogously to the illustration in FIG. 3B, shows a receiving state of the external packaging 110, in which a bag border 168 of the bag element 150 is turned over in order to open up an opening 158 of the bag element 150 for filling with the at least one package 112. In an analogous illustration to FIG. 3C, FIG. 4C shows a section through the external packaging 110 in a filled state, in which the opening 158 is closed.

The exemplary embodiment in FIGS. 4A to 4C therefore substantially corresponds to the exemplary embodiment in FIGS. 3A to 3C. Again, the bag element 150 has openings 176 which may also be referred to as handle openings, for example slot-shaped openings 176, in particular perforations 178, in a bag wall 152 of the bag element 150. Said openings 176 may typically be at a distance of at least about 100 mm from the lower side 118 of the carrier element 114. Whereas, in the exemplary embodiment in FIGS. 3A to 3C, handles 128 of the carrier element 114 are arranged in the interior of the bag element 150, in the exemplary embodiment according to FIGS. 4A to 4C the handles 128, in particular handle tabs 132, project out of the bag element 150 through the openings 176. Accordingly, the handle tabs 132 in the illustration according to FIG. 4A are not illustrated by dashed lines on the right side. The handle tabs 128 can project perpendicularly upward from the upper edge 130 of the carrier element 114, as illustrated in FIGS. 4A and 4C, but may also be folded down laterally, as shown in FIG. 4B. The configuration, in which the handles 128 and, in particular, the handle tabs 132 project outward through the openings 176, has numerous advantages, as explained above. In this configuration, the carrier element 114, which can typically be produced from a carton material, is entirely or partially surrounded by the bag element 150 and is thereby protected from moisture. At the same time, however, the handles 128 are easily accessible from the outside, even in the packaged state, for example in the closed state of the external packaging 110 that is illustrated in FIG. 4A, for transportation.

As illustrated in FIG. 4B, in the receiving state in which the bag border 168 is turned over, the handles 128 and, in particular, the handle tabs 132 and the openings 176 can be arranged below the turned-over bag border 168. Other configurations are also possible.

Furthermore, the exemplary embodiment in FIGS. 4A to 4C shows further possible modifications of the exemplary embodiment according to FIGS. 3A to 3C, which modifications are also realizable individually or in any combination, even, for example, in the exemplary embodiment according to FIGS. 3A to 3C. The exemplary embodiment in FIGS. 4A to 4C, as is apparent in particular from FIGS. 4B and 4C, thus shows that a connection between the bag element 150 and the carrier element 114 is not necessarily required. In particular, if the carrier element 114 is entirely or partially surrounded by the bag element 150, a fixing of the carrier element 114 to the bag element 150, for example by adhesive tapes 156 as in FIGS. 3A to 3C, can be dispensed with. The carrier element 114 can therefore rest in particular loosely on the bag element 150 such that, in particular in the closed state shown in FIG. 4A, slipping of the carrier element 114 relative to the bag element 150 is scarcely possible any longer.

Furthermore, the configuration in FIGS. 4A to 4C, which is likewise apparent in particular in the illustration according to FIGS. 4B to 4C, shows that the handles 128, and in particular the handle tabs 132, may be of reinforced design in this or else in other exemplary embodiments. In particular, the handles 128 may each have at least one handle reinforcement 180. The at least one handle reinforcement 180 may, for example, completely or partially surround the handles 128. For example, said handle reinforcement 180 can be mounted onto a carton material of the carrier element 114 in the region of the handles 128. In particular, the handle reinforcement 180 can be entirely or partially produced from an adhesive tape which, in particular is adhesively bonded onto the handle tabs 132, for example onto an inner side (as illustrated in FIGS. 4B and 4D) and/or an outer side of the handle tabs 132.

It is noted that terms like "preferably," "commonly," and "typically" are not utilized herein to limit the scope of the claimed subject matter or to imply that certain features are critical, essential, or even important to the structure or function of the embodiments disclosed herein. Rather, these terms are merely intended to highlight alternative or additional features that may or may not be utilized in a particular embodiment of the present disclosure.

It is also noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modifications and variations come within the scope of the appended claims and their equivalents.

What is claimed is:

1. An external packaging for safeguarding at least one package during transportation, the external packaging comprising:
   a carrier element with an upper side and a lower side, wherein the carrier element comprises:
      a base part directed toward the lower side;
      a border directed toward the upper side, and
      at least two handles associated with the border,
      wherein the carrier element is at least partially open toward the upper side and includes an area configured to carry the package; and
   a tubular bag element that at least partially surrounds the carrier element, the bag element comprising:
      a closed end serving as a base of the bag element;
      a closable opening at an end opposite the base such that the package may be placed in the carrier element through the opening in the bag element, wherein the closable opening is approximately the same area as the entire area within the border of the carrier element configured to carry the package;
a wall between the base and the opening, wherein the wall folds such that the bag element is selectable between a receiving state and a filled state, wherein the bag element transitions between the receiving state and the filled state by, after the package is introduced in the carrier element, having the wall of the bag element folded up over the package; and
at least two handle openings within the wall separate from the closable opening;
wherein:
the bag element is configured to surround the package carried by the carrier element,
the bag element is arranged relative to the carrier element in such a manner that said bag element, at least in a maximum filling state, extends on the upper side of the carrier element beyond the border of the carrier element, and
the handles of the carrier element are accessible through the handle openings.

2. The external packaging as claimed in claim 1, wherein the bag element surrounds the carrier element in such a manner that the base part of the carrier element rests on a base of the bag element.

3. The external packaging as claimed in claim 1, wherein the carrier element further comprises at least two handle tabs, and wherein the handles are arranged in the handle tabs.

4. The external packaging as claimed in claim 3, wherein the carrier element is configured such that the handle tabs pull out from and/or extend out from the border of the carrier element.

5. The external packaging as claimed in claim 4, wherein, in at least one of a pulled out state and an extended state, the handle tabs do not protrude laterally over the border.

6. The external packaging as claimed in claim 4, wherein the handle tabs pull out from and/or extend out from the border of the carrier element toward the upper side.

7. The external packaging as claimed in claim 1, wherein the handles project out of the bag element through the openings.

8. The external packaging as claimed in claim 1, wherein the handles further comprise at least one handle reinforcement.

9. The external packaging as claimed in claim 8, wherein the handles each further comprise at least one handle reinforcement mounted onto a carton material.

10. The external packaging as claimed in claim 1, wherein the carrier element is at least partially produced from a material selected from the group consisting of a carton material, a plastics material, and a wood material.

11. The external packaging as claimed in claim 10, wherein the carrier element is at least partially produced from a plastics material, and wherein the plastics material is a foamed plastics material.

12. The external packaging as claimed in claim 1, wherein the carrier element is configured as a rectangular shape, wherein the bag element has four sides, wherein at least two mutually opposite sides have a width that corresponds at least to an edge length of the border.

13. The external packaging as claimed in claim 1, wherein the bag element is formed from a group consisting of polyethylene, polypropylene, polyethylene terephthalate, and combinations thereof.

14. The external packaging as claimed in claim 1, wherein the closable opening of the bag element is closable with an adhesive.

15. The external packaging as claimed in claim 1, wherein the handle openings are perforations in the wall of the bag element.

16. The external packaging as claimed in claim 1, wherein the wall includes a round cross-section.

17. The external packaging of claim 1, wherein:
when the bag element is in the receiving state, the border of the carrier element extends outward past the wall and closable opening, and
when the bag element is in the filled state, the wall of the bag element extends beyond the border of the carrier element.

18. The external packaging of claim 1, wherein:
when the bag element is in the receiving state, the wall of the bag element is folded down from the opening, and
when the bag element is in the filled state, the wall of the bag element is folded over the package and sealed.

19. An external packaging for safeguarding at least one package during transportation, the external packaging comprising:
a carrier element with an upper side and a lower side, wherein the carrier element comprises:
a base part directed toward the lower side;
a border directed toward the upper side, and
at least two handles associated with the border,
wherein the carrier element is at least partially open toward the upper side and includes an area configured to carry the package; and
a tubular bag element that at least partially surrounds the carrier element, the bag element comprising:
a closed end serving as a base of the bag element;
a closable opening at an end opposite the base such that the package may be placed in the carrier element through the opening in the bag element, wherein the closable opening is approximately the same area as the area of the carrier element configured to carry the package;
a wall between the base and the opening, wherein the wall folds such that the bag element is selectable between a receiving state and a filled state, wherein:
the bag element transitions between the receiving state and the filled state by, after the package is introduced in the carrier element, having the wall of the bag element folded up over the package;
when the bag element is in the receiving state, the border of the carrier element extends outward past the wall and closable opening, and
when the bag element is in the filled state, the wall of the bag element extends beyond the border of the carrier element;
at least two handle openings within the wall separate from the closable opening;
wherein:
the bag element is configured to surround the package carried by the carrier element,
the bag element is arranged relative to the carrier element in such a manner that said bag element, at least in a maximum filling state, extends on the upper side of the carrier element beyond the border of the carrier element, and
the handles of the carrier element are accessible through the handle openings.

20. An external packaging for safeguarding at least one package during transportation, the external packaging comprising:
- a carrier element with an upper side and a lower side, wherein the carrier element comprises:
  - a base part directed toward the lower side;
  - a border directed toward the upper side, and
  - at least two handles associated with the border,
  - wherein the carrier element is at least partially open toward the upper side and includes an area configured to carry the package; and
- a tubular bag element that at least partially surrounds the carrier element, the bag element comprising:
  - a closed end serving as a base of the bag element;
  - a closable opening at an end opposite the base such that the package may be placed in the carrier element through the opening in the bag element, wherein the closable opening is approximately the same area as the area of the carrier element configured to carry the package;
  - a wall between the base and the opening, wherein the wall folds such that the bag element is selectable between a receiving state and a filled state, wherein:
    - the bag element transitions between the receiving state and the filled state by, after the package is introduced in the carrier element, having the wall of the bag element folded up over the package;
    - when the bag element is in the receiving state, the wall of the bag element is folded down from the opening; and
    - when the bag element is in the filled state, the wall of the bag element is folded over the package and sealed;
  - at least two handle openings within the wall separate from the closable opening;
- wherein:
  - the bag element is configured to surround the package carried by the carrier element,
  - the bag element is arranged relative to the carrier element in such a manner that said bag element, at least in a maximum filling state, extends on the upper side of the carrier element beyond the border of the carrier element, and
  - the handles of the carrier element are accessible through the handle openings.

* * * * *

UNITED STATES PATENT AND TRADEMARK OFFICE
CERTIFICATE OF CORRECTION

PATENT NO. : 9,873,546 B2  Page 1 of 1
APPLICATION NO. : 13/827449
DATED : January 23, 2018
INVENTOR(S) : Burkardt et al.

It is certified that error appears in the above-identified patent and that said Letters Patent is hereby corrected as shown below:

On the Title Page

Insert item (73), --ROCHE DIAGNOSTICS OPERATIONS, INC.--

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*